United States Patent [19]
Ohnaka

[11] 3,912,317
[45] Oct. 14, 1975

[54] VACUUM SUCTION TYPE MANIPULATOR
[75] Inventor: Makoto Ohnaka, Yokohama, Japan
[73] Assignee: Shiroyama Kogyo Kabushiki Kaisha, Japan
[22] Filed: July 10, 1974
[21] Appl. No.: 487,064

[52] U.S. Cl............ 294/64 R; 214/1 BT; 294/64 A
[51] Int. Cl............................................. B66c 1/02
[58] Field of Search........ 294/64 R, 64 A, 64 B, 88; 91/168, 179, 189, 193; 137/580, 625.69; 214/1 BB, 1 BS, 1 BT; 251/74, 353; 269/21

[56] References Cited
UNITED STATES PATENTS
| | | | |
|---|---|---|---|
| 2,200,800 | 5/1940 | Miller | 294/64 A |
| 3,039,623 | 6/1962 | Sehn et al. | 294/64 A X |
| 3,349,927 | 10/1967 | Blatt | 214/1 BT |
| 3,804,397 | 4/1974 | Neumann | 294/64 R X |

Primary Examiner—Richard A. Schacher
Assistant Examiner—Johnny D. Cherry
Attorney, Agent, or Firm—Frank J. Jordan

[57] ABSTRACT

A vacuum suction type manipulator includes a tube extendably and retractably mounted in a cylinder and having a suction device mounted thereon. The application of air under pressure from a single source is operable to extend and retract the tube and to apply a suction to the suction device when the tube is moved from its retracted position.

10 Claims, 1 Drawing Figure

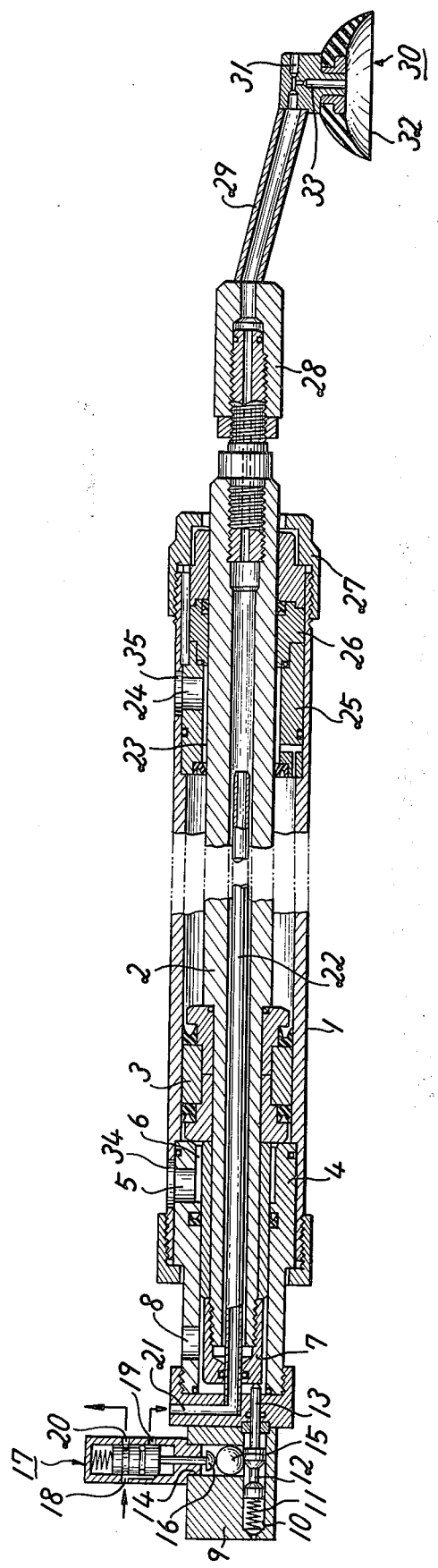

3,912,317

VACUUM SUCTION TYPE MANIPULATOR

BACKGROUND OF THE INVENTION

This invention relates to a manipulator and more particularly to a manipulator having a vacuum suction head mounted on an extendably and retractably movable tube.

Heretofore, known prior art manipulator devices employing vacuum suction heads were not always capable of utilizing a single source of pressurerized air to provide the motive force for operating the manipulator arm and to provide the suction for the suction head while at the same time providing for suction capability during manipulative movement of the manipulator arm.

Accordingly, an object of the present invention is to overcome the disadvantages of known prior art arrangements and to provide a vacuum type suction manipulator which is capable of using a single source of air under pressure for extending and retracting a manipulator arm while at the same time providing the air necessary to establish suction capability of a suction head on the manipulator arm during its extension and retraction. Thus, applicant's invention is capable of utilizing a single source of air under pressure to provide the motivating force for extending and retracting the manipulator arm and also for applying the suction to the vacuum head while at the same time providing that the suction head is under vacuum conditions when the manipulator is extended and under a non-vacuum condition when the manipulator is in its retracted position.

Another object of the present invention is to provide a compact and simplified arrangement for a manipulator in the form, construction, and arrangement of the various elements whereby the above named and other objects may effectively be attained.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

A vacuum suction type manipulator includes a piston operable in an elongated cylinder. The piston has a tube affixed thereto and is slidable between extended and retracted positions. A suction device is mounted on the end of the tube and the latter conducts operating air to the suction device. A valve is mounted on the cylinder for introducing air into the tube and operable means are provided for controlling the valve such that the valve is closed when the tube is in substantially its retracted position and is open as the tube is extended, whereby operating air passes through the tube to operate the suction device for substantially all extended positions of the tube.

BRIEF DESCRIPTION OF THE DRAWING

The accompanying drawing is a sectional view of a vacuum suction type manipulator according to one embodiment of the invention.

DESCRIPTION OF THE PREFERRED EMBODIMENTS

Referring to the drawing, there is shown a cylinder 1 suitably supported by a non-illustrated fixture. A tube 2 is slidable mounted in the cylinder 1 and the rear portion of the tube is retained and slidably supported on the inside of the cylinder 1 by means of a piston 3. A guide tube 4 is disposed in and secured to the cylinder 1 at a location to the rear of the piston 3 as shown in the drawings. The guide tube 4 has a forward portion in which there is disposed a lateral opening 5 which communicates with another passage 6 leading to the inside of the cylinder 1 at the left or rear of the piston 3.

As can be seen in the drawing, the rear portion of the guide tube 4 extends beyond the cylinder 1 and a push member 7 is disposed in this extended portion of the guide tube 4 with a clearance provided therebetween. The push member 7 is mated and secured such as by the illustrated thread engagement with the rear end portion of the sliding tube 2. The guide tube 4 is also provided with another lateral opening 8.

A valve casing 9 is suitably secured to the rear end of the guide tube 4. This valve casing 9 has a horizontally disposed passageway 10 in which there is provided a compression spring 11 and a longitudinally slidably mounted axial cam 12. As can be seen in the drawing, the spring 11 biases the axial cam 12 to the right. The axial cam 12 has a central portion which is of a smaller diameter than the adjacent portions and also has a front section in the form of a rod 13 projecting into the cylinder 1 to a position where the rod 13 is capable of bearing against the rear surface of the push member 7 as shown in the drawing.

A vertical hole or passageway 14 is provided in the valve casing 9 and opens up to the lateral passageway 10 at right angles. Disposed within the vertical passage 14 in a loosely fitted relationship is a ball 15 which is adapted to contact the axial cam 12 as will be further described. Mounted on the valve casing 9 is a cross valve 17 in which there is slidably mounted a valve element 16. The valve element 16 is biased by a spring so that the valve element 16 is urged against the ball 15. The cross valve 17 is provided with an air inlet 18 for pressurized air, a delivery port 19, and an outlet 20 as will be further described. When the valve element 16 is disposed in its upward position, the air entering the inlet port 18 passes to the outlet port 20. This is the position of the valve as shown in the drawing. On the other hand, when the valve 16 is moved downwardly to its lower position, air passes through to the delivery port 19.

The valve casing has a passageway 21 and a non-illustrated conduit extends between the delivery port 19 and passageway 21 for conducting air from the cross valve 17 to the passageway 21. A conduit 22 extends from the passageway 21 into the tube 2. This conduit 22 passes through the push member 7 and a sliding seal is provided between the push member 7 and the conduit 22. The conduit 22 extends to the forward portion of the sliding tube 2 as shown in the drawing.

Secured in the forward part of the cylinder 1 is an air duct means 25 which partly defines a passageway 23 between the cylinder 1 and the outer surface of the sliding tube 2. The air duct means is also provided with a lateral opening 24 which communicates with the passageway 23. The forward portion of the air duct means 25 is closed by a packing 26 and a cap 27 which threadedly engages the cylinder 1. The front end of the sliding tube 2 extends through a central opening of the cap 27.

A conduit 29 is suitable secured to the front end of the sliding tube 2 by means of an appropriate holder 28. Disposed on the forward end of the conduit 29 is a vacuum suction device 30 which includes a head portion to which a downwardly facing suction cup 32 is affixed. The head portion of the suction device 30 is provided with a through hole 31 in communication with the conduit 29. A vertical passageway 33 in the head portion of the suction device communicates an intermediate portion of the passageway 31 with the suction cup 32 as shown in the drawing. It will be seen that the passageway 31 opens to the atmosphere at its most forward end. Accordingly, as will be further described, air passing from the conduit 29 through the passage 31 through to the atmosphere will create a Venturi effect in the passageway 33 to draw a vacuum in the suction cup 32.

It will be seen that openings 34 and 35 are provided in the respective locations in the cylinder 1 corresponding respectively to the location of the lateral opening 5 in the guide tube 4 and the lateral opening 24 in the air duct means 25.

Having described the structure of the vacuum suction type manipulator, a description of its operation will now be set forth. The non-operating position of the manipulator is shown in the drawing. In this non-operative condition, air under pressure is introduced into the cylinder 1 through the opening 35 whereby the air passes through the lateral opening 24 and passageway 23 so as to urge the piston 3 and the sliding tube 2 to their rearward position, that is to the left in the accompanying drawing. When this occurs, the operating rod 13 is pushed rearwardly to the left by the push member 7. When the operating rod 13 is in this latter position, the larger diameter portion of the axial cam 12 is disposed to underlie the vertical passage 14 in which the ball 15 is located and accordingly, the ball 15 is retained in its raised position. In this latter position, the valve element 16 is in its raised position so that the air entering the inlet 18 of the cross valve 17 passes through to the outlet 20.

When it is desired to operate the manipulator, air under pressure is introduced through the opening 34 and the lateral opening 24 together with its mating opening 35 are opened to the atmosphere. Air under pressure introduced to the opening 34 passes through the passages 6 whereby the action of this air pressure along with the action of air pressure introduced through the lateral opening 8 in the guide tube 4 causes the piston 3 as well as the sliding tube 2 and the push member 7 to be advanced forwardly, to the right in the drawings. When this occurs, the operating rod 13 is also advanced forwardly or to the right by the spring 11.

When the operating rod 13 is advanced in this manner, the smaller diameter portion of the axial cam 12 is moved to a position underlying the vertical hole 14 whereby the ball 15 moves downwardly into the depressed smaller diameter portion. Accordingly, the valve stem 16 is moved downwardly and as a result, air under pressure entering the inlet 18 is now passed to the delivery port 19 from which it is introduced to the passageway 21 and to the conduit 22. The air passing through the conduit 22 is discharged at the open end of the passageway 31 in the suction device 30. The air passing through the passageway 31 draws a suction on the passage 33 due to the Venturi effect thereby applying a suction to the vacuum cup 30.

The above operation of the manipulator may be effected utilizing a single source of air under pressure and utilizing appropriate and suitable non-illustrated valve means.

In order to return the manipulator to its non-operative position, air under pressure is introduced through the opening 35 to pass through the passages 23 into the cylinder 1 to move the piston 3 to its rear position. Air in the back of the piston 3 is discharged through the lateral opening 8 in the rear of the guide tube 4.

From the above description, it will be seen that when the slide tube 2 is advanced even a small distance, the suction device 30 automatically acquires its suction capability. Thus it will be seen that the suction cup 32 has this suction capability when the slide tube is being moved forward to a desired position and when it is being returned to its non-operative and retracted position. The manipulator is constructed, arranged, and operated so that the suction head acquires suction capability while the slide tube is being moved into and out of position and in addition, the operation of the manipulator device, including the motive force for extending and returning the slide tube and the capability of providing suction on the suction device, may be obtained from a single source of pressurized air.

It is thought that the invention and many of its attendant advantages will be understood from the foregoing description and that it will be apparent that various changes may be made in the form construction, and arrangements of the parts without departing from the spirit and scope of the invention or sacrificing all of its material advantages. The form heretofore described being merely a preferred embodiment thereof.

What is claimed is:

1. A vacuum suction type manipulator comprising an elongated cylinder, a piston operable in said cylinder, said piston having a tube means affixed thereto and being slidable between extended and retracted positions, a suction device mounted on the end of said tube means, said tube means conducting operating air to said suction device, a valve mounted on said cylinder for introducing air into said tube means, and operable means for controlling said valve such that the valve is closed when said tube means is in substantially its retracted position and is open as said tube means is extended, whereby operating air passes through said tube means to operate said suction device for substantially all extended positions of the tube means.

2. A vacuum suction type manipulator according to claim 1 wherein said suction device includes a suction head having a suction cup mounted thereon, and means in said suction head receiving air under pressure from said tube means and operable to provide a suction to said suction cup.

3. A vacuum suction type manipulator according to claim 2 including a first passageway in said suction head open at one end and communicating with said tube means at the other end, a second passageway extending between said first passageway and said suction cup such that air under pressure flowing from said tube means through said first passageway to the open end of the latter is operable to effect a venturi action and draw in air through such second passageway leading from said suction cup.

4. A vacuum suction type manipulator according to claim 1 including a conduit fixed to said cylinder and extending longitudinally into said tube means, and a sliding seal between said conduit and said slidable tube means, said conduit conducting air under pressure from said valve to said tube means.

5. A vacuum suction type manipulation according to claim 4 wherein said valve means comprises a valve body mounted on said cylinder, said operable means comprising an operating element slidably mounted in said valve body and extending into said cylinder to a position wherein said operating element is engaged by said tube means to slide said operating element to a first position when said tube means is in said retracted position to thereby close said valve.

6. A vacuum suction type manipulator according to claim 5 including means biasing said operating element to a second position which opens said valve.

7. A vacuum suction type manipulator according to claim 6 wherein said valve means includes a slidably mounted valve element having an inlet and a first and second outlet port, said valve element having a first position wherein air is conducted from said inlet port to said first outlet port and a second position wherein air is conducted from said inlet port to said second outlet port, said second outlet port leading air to said conduit.

8. A vacuum suction type manipulator according to claim 7 including an operative connection between said valve element and said operating element whereby when the latter is in said first position, said valve element is in said first position and when said operating element is in said second position, said valve element is in said second position.

9. A vacuum suction type manipulator according to claim 8 wherein said operative connection includes a ball operable to ride on an indented or raised portion of said operating element.

10. A vacuum suction type manipulator according to claim 1 including means for introducing air under pressure into said cylinder to effect displacement of said piston and tube means between said extended and retracted positions.

* * * * *